United States Patent
Chen

(10) Patent No.: US 9,480,009 B2
(45) Date of Patent: Oct. 25, 2016

(54) METHOD AND APPARATUS FOR DETECTING CELL IDENTITY CONFLICT

(71) Applicant: Huawei Technologies Co., Ltd., Shenzhen, Guangdong (CN)

(72) Inventor: Xiongfei Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/585,965

(22) Filed: Dec. 30, 2014

(65) Prior Publication Data

US 2015/0119030 A1 Apr. 30, 2015

Related U.S. Application Data

(63) Continuation of application No. PCT/CN2012/078438, filed on Jul. 10, 2012.

(51) Int. Cl.
  *H04W 48/16* (2009.01)
  *H04W 24/02* (2009.01)
  *H04W 76/02* (2009.01)

(52) U.S. Cl.
  CPC ............ *H04W 48/16* (2013.01); *H04W 24/02* (2013.01); *H04W 76/021* (2013.01)

(58) Field of Classification Search
  CPC ............ H04W 76/021; H04W 48/16; H04W 36/0061; H04W 88/08; H04W 92/20; H04W 36/08; H04W 48/10; H04W 84/045; H04W 84/042; H04W 36/0072; H04W 36/0077; H04W 72/0426; H04W 24/02; H04W 24/10
  See application file for complete search history.

(56) References Cited

U.S. PATENT DOCUMENTS

2010/0173626 A1 7/2010 Catovic et al.
2010/0178912 A1 7/2010 Gunnarsson et al.

FOREIGN PATENT DOCUMENTS

| CN | 102215482 A | 10/2011 |
| CN | 102244877 A | 11/2011 |
| KR | 10-2012-0031081 | 3/2012 |
| WO | WO 2010/149709 A1 | 12/2010 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.5.0, Dec. 2010, 252 pages.
"UE-assisted heuristic detection of PCI collision", Qualcomm Europe, 3GPP TSG-RAN WG2 meeting #65bis, Mar. 23-27, 2009, 3 pages.
"LTE Control Plane session report", RAN2 Chairman, 3GPP TSG RAN WG2 #65bis, Mar. 23-27, 2009, 21 pages.

*Primary Examiner* — Nizar Sivji

(57) ABSTRACT

Embodiments of the present invention provide a method and an apparatus for detecting a cell identity conflict. The method includes: determining that a user equipment accesses a first cell or performs connection establishment or connection re-establishment in a first cell at a first time point T1; searching whether interaction information related to the user equipment exists in other cells except the first cell near the first time point T1; and performing cell identity conflict detection on the first cell and a second cell when it is found, through the searching, that the interaction information related to the user equipment exists in the second cell among the other cells near the first time point T1. The embodiments of the present invention do not rely on a neighboring cell list and an operation of reporting cell information by a user equipment, thereby improving detection efficiency of a cell identity conflict.

12 Claims, 3 Drawing Sheets

METHOD AND APPARATUS FOR DETECTING CELL IDENTITY CONFLICT

CROSS-REFERENCE TO RELATED APPLICATIONS

This application is a continuation of International Application PCT/CN2012/078438, filed on Jul. 10, 2012, which is hereby incorporated by reference in its entirety.

TECHNICAL FIELD

Embodiments of the present invention relate to the field of wireless communications, and in particular, to a method and an apparatus for detecting a cell identity conflict.

BACKGROUND

A radio access network is generally formed of multiple cells of multiple base stations. Each cell needs to have a unique "cell identity" at an air interface for a UE (User Equipment, user equipment) to identify. For example, each cell is allocated a BSIC (Base Station Identity Code, base station identity code) in a GSM (Global System for Mobile communication, global system for mobile communications), each cell is configured with a PSC (Primary Scrambling Code, primary scrambling code) in a UMTS (Universal Mobile Telecommunications System, universal mobile telecommunications system), and each cell is configured with a PCI (Physical Cell Identity, physical cell identity) in LTE, where the BSIC, the PSC, and the PCI are each a "cell identity" used by the air interface to identify a cell. In mobility management, a handover target cell is selected by using the "cell identity".

Neighboring cells need to be configured with different cell identities; otherwise, downlink interference is aggravated, handover is affected, and call drop occurs when the downlink interference is serious. However, the number of cell identities is generally limited; for example, there are only 512 PSCs in the UMTS, and 504 PCIs in the LTE. When there are a large number of cells, the cell identities need to be repeatedly used, that is, a same cell identity is used for multiple cells; however, these cells with the same cell identity need to be isolated as far as possible during network planning, so as to prevent a cell identity conflict caused by a fact that these cells are neighboring to each other.

However, due to complexity of actual networking, geographical locations, and environmental changes, it is difficult to prevent a phenomenon of a cell identity conflict, that is, a phenomenon that coverage of cells with a same cell identity is neighboring or even overlaps, in an existing network. For this reason, each equipment vendor has a corresponding solution to prevent, detect, and solve a possible problem of a cell identity conflict.

In an existing solution, a possible cell identity conflict is obtained by comparing cell information (for example, a measurement report, or a target cell in handover signaling) reported by a UE with a configured neighboring cell list. However, this manner relies on the cell information reported by the UE and the neighboring cell list; and if neighboring cell lists of two cells using a same cell identity do not have an intersection or the UE does not trigger an operation of reporting cell information, cell identity conflict detection cannot be performed.

SUMMARY

Embodiments of the present invention provide a method and an apparatus for detecting a cell identity conflict, which can detect a cell identity conflict without relying on a neighboring cell list and an operation of reporting cell information by a user equipment.

In one aspect, a method for detecting a cell identity conflict is provided and includes: determining that a user equipment accesses a first cell or performs connection establishment or connection re-establishment in a first cell at a first time point T1; searching whether interaction information related to the user equipment exists in other cells except the first cell near the first time point T1, where the interaction information is used to record last contact information between the user equipment and the other cells; and performing cell identity conflict detection on the first cell and a second cell when it is found, through the searching, that the interaction information related to the user equipment exists in the second cell among the other cells near the first time point T1.

In another aspect, an apparatus for detecting a cell identity conflict is provided and includes: a determining unit, configured to determine that a user equipment accesses a first cell or performs connection establishment or connection re-establishment in a first cell at a first time point T1; a searching unit, configured to search whether interaction information related to the user equipment exists in other cells except the first cell near the first time point T1, where the interaction information is used to record last contact information between the user equipment and the other cells; and a detecting unit, configured to perform cell identity conflict detection on the first cell and a second cell when the searching unit finds, through the searching, that the interaction information related to the user equipment exists in the second cell among the other cells near the first time point T1.

In the embodiments of the present invention, whether interaction information exists in other cells near a time point when a user equipment accesses a cell or performs connection establishment or connection re-establishment in a cell is searched, and cell identity conflict detection is performed on the cell and the other cells in which it is found, through searching, that the interaction information exists, without relying on a neighboring cell list and an operation of reporting cell information by the user equipment, thereby improving detection efficiency of a cell identity conflict.

BRIEF DESCRIPTION OF THE DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, for example, a GSM, a code division multiple access (CDMA, Code Division Multiple Access) system, wideband code division multiple access (WCDMA, Wideband Code Division Multiple Access) system, a general packet radio service (GPRS, General Packet Radio Service) system, and long term evolution (LTE, Long Term Evolution) system.

A user equipment (UE, User Equipment), which may also be called a mobile terminal (Mobile Terminal), a mobile user equipment, or the like, may communicate with one or more core networks through a radio access network (for example, RAN, Radio Access Network); and the user equipment may be a mobile terminal, such as a mobile phone (or called a "cellular" phone) or a computer with a mobile terminal, which, for example, may be a portable, pocket-size, handheld, computer-integrated or vehicle-mounted mobile apparatus, and exchanges a language and/or data with the radio access network.

Figure 1:
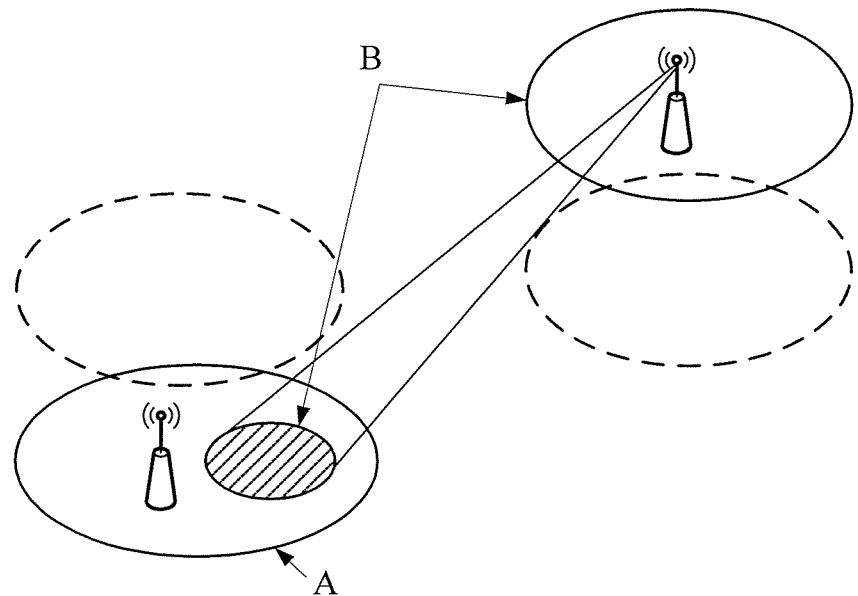
FIG. 1 is a schematic diagram of a cell identity conflict scenario to which an embodiment of the present invention is applied.

FIG. 1 is a schematic diagram of a cell identity conflict scenario to which an embodiment of the present invention is applied. For the purpose of simplicity, FIG. 1 shows only two cells A and B whose cell identities conflict; however, the embodiment of the present invention does not limit the number of cells whose cell identities conflict. The embodiment of the present invention may be similarly applied to more cells.

The embodiment of the present invention may be used to detect any cells A and B whose "cell identities" conflict. Particularly, the cell B in FIG. 1 includes a shadow area, and a dotted box schematically shows a part of neighboring cells of the cell A or B. In this case, the following cross-boundary and overlapping coverage scenarios may be formed: The cells A and B have a same cell identity; generally there is a relatively long physical distance between A and B; in addition, a neighboring cell list of A may have no intersection with a neighboring cell list of B; and the cells A and B have an overlapping coverage area, that is, the shadow area shown in FIG. 1, and a handover failure or call drop easily occurs to a UE in this area. In this scenario, the handover failure or the call drop caused by a cell identity conflict is quite covert, and it is difficult to locate this type of a cell identity conflict problem in the prior art.

For example, if cell identity conflict detection is performed according to a manner of triggering a measurement report by a UE and a neighboring cell list, in this scenario, because the neighboring cell list of the cell A has no intersection with the neighboring cell list of the cell B, the prior art cannot be used to identify, through a third-party cell in an associated manner, whether the cells A and B are close to each other or have a cell identity conflict with each other; in another aspect, if the UE does not trigger the measurement report, a transmission block error may occur due to interference, or even call drop may be caused due to severe interference.

Severity of a consequence that the foregoing scenario may lead to is related to relative signal strength of each cell in an overlapping coverage area of the cells A and B. If no dominant cell exists or the interference is severe in the overlapping coverage area, the call drop may occur. If a dominant cell exists in the overlapping coverage area, a user throughput is affected, and therefore, a cell capacity is affected.

Figure 2:
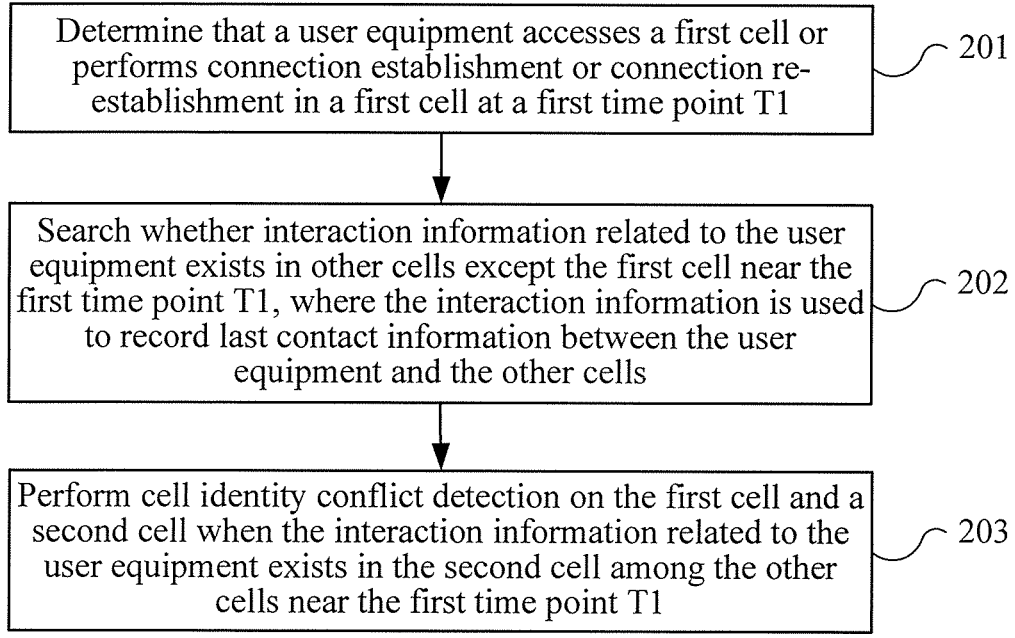
FIG. 2 is a flowchart of a method for detecting a cell identity conflict according to an embodiment of the present invention.

FIG. 2 is a flowchart of a method for detecting a cell identity conflict according to an embodiment of the present invention. The method in FIG. 2 may be implemented by any suitable apparatus, for example, may be implemented by a network element such as a base station, a base station controller, or a network-side server; or may be implemented by a processing apparatus independent of a communications network.

201: Determine that a user equipment accesses a first cell or performs connection establishment or connection re-establishment in a first cell at a first time point T1.

When attempting access or performing connection establishment or connection re-establishment, the user equipment sends corresponding signaling. A time point corresponding to the signaling, for example, a time point when a network-side device (such as a base station or a base station controller) receives the signaling, may be recorded as the first time point T1.

202: Search whether interaction information related to the user equipment exists in other cells except the first cell near the first time point T1. The interaction information is used to record last contact information between the user equipment and the other cells.

A time point near the first time point T1 refers to a time point T whose interval with T1 is less than or equal to predetermined thresholds, that is, it should be satisfied that $T-\Delta T_a \leq T1 \leq T+\Delta T_b$. The foregoing predetermined thresholds $\Delta T_a$ and $\Delta T_b$ are nonnegative, and may be equal or not equal to each other. In addition, "$\leq$" indicates that a time point to the left of this symbol is not later than a time point to the right of this symbol. The predetermined thresholds may be set according to one or more factors. For example, the predetermined thresholds may be related to a moving speed of a UE in a cell; and if there are a large number of UEs moving at a high speed in the cell, the foregoing predetermined thresholds may be set to lower values to make it as far as possible that the high-speed UEs are impossible to cross N cells within a period defined by the predetermined thresholds, where N is generally greater than 1. For another example, the predetermined thresholds may be related to a coverage radius of the cell; and if the coverage radius of the cell is relatively small, the foregoing predetermined thresholds may be set to lower values to make it as far as possible that the UE is impossible to cross N cells within a period defined by the predetermined thresholds. Alternatively, the predetermined thresholds may be related to a distance between two cells; and if the distance between the two cells is relatively small, the foregoing predetermined thresholds may be set to lower values to make it as far as possible that the UE is impossible to move from coverage of one cell to coverage of the other cell within a period defined by the predetermined thresholds. The embodiment of the present invention is not limited to the foregoing manner. Alternatively, clock deviation between two network-side devices may also be considered for setting of the predetermined thresholds.

For example, when the clock deviation between the two network-side devices is compensated, the predetermined thresholds in the embodiment of the present invention are generally measured by minute (minute), for example, less than 2 minutes.

203: Perform cell identity conflict detection on the first cell and a second cell when it is found, through the searching, that the interaction information related to the user equipment exists in the second cell among the other cells near the first time point T1.

Optionally, as an embodiment, a "cell identity" in the embodiment of the present invention is an identity configured for a cell during network planning for a user equipment to identify the cell; and a same "cell identity" may be used for multiple cells, and for example, may be a BSIC in a GSM, a PSC in a UMTS, or a PCI in an LTE system.

In the embodiment of the present invention, whether interaction information exists in other cells near a time point when a user equipment accesses a cell or performs connection establishment or connection re-establishment in a cell is searched, and cell identity conflict detection is performed on the cell and the other cells in which it is found, through searching, that the interaction information exists, without relying on a neighboring cell list and an operation of reporting cell information by the user equipment, thereby improving detection efficiency of a cell identity conflict.

The method in FIG. 2 may be implemented in real time, for example, implemented by a network element such as a base station, a base station controller, or a network-side server in a communication process of the user equipment. Alternatively, the method in FIG. 2 may be implemented in non-real time, for example, implemented by a processing apparatus independent of a communications network after interaction information of each cell within a period is collected. The embodiment of the present invention does not limit an execution body and an execution manner of the method in FIG. 2.

In the foregoing cross-boundary and overlapping coverage scenarios described with reference to FIG. 1, the distance between the cells A and B is relatively large. Generally, within the period defined by the predetermined thresholds, a UE is not likely to move from coverage of the cell A in planning to coverage of the cell B in planning. If air interface interaction between a same UE and the cells A and B is associated with each other (for example, the interaction is continuous or overlaps), the cells A and B should be neighboring cells or have an overlapping coverage area. In the embodiment of the present invention, it is first determined that association exists between the same UE and the two cells A and B at the same time or within a short interval, so as to decide whether to trigger processing of cell identity conflict detection, which does not need to rely on a measurement report of the UE and a neighboring cell list. Particularly, in the foregoing cross-boundary and overlapping coverage scenarios described with reference to FIG. 1, if a severe consequence occurs, for example, a handover failure or call drop causes re-access, connection establishment, or connection re-establishment of the UE, corresponding access signaling is generated within a relatively short period, and the processing of the cell identity conflict detection may be triggered according to the embodiment of the present invention, so as to improve the detection efficiency.

Figure 3:
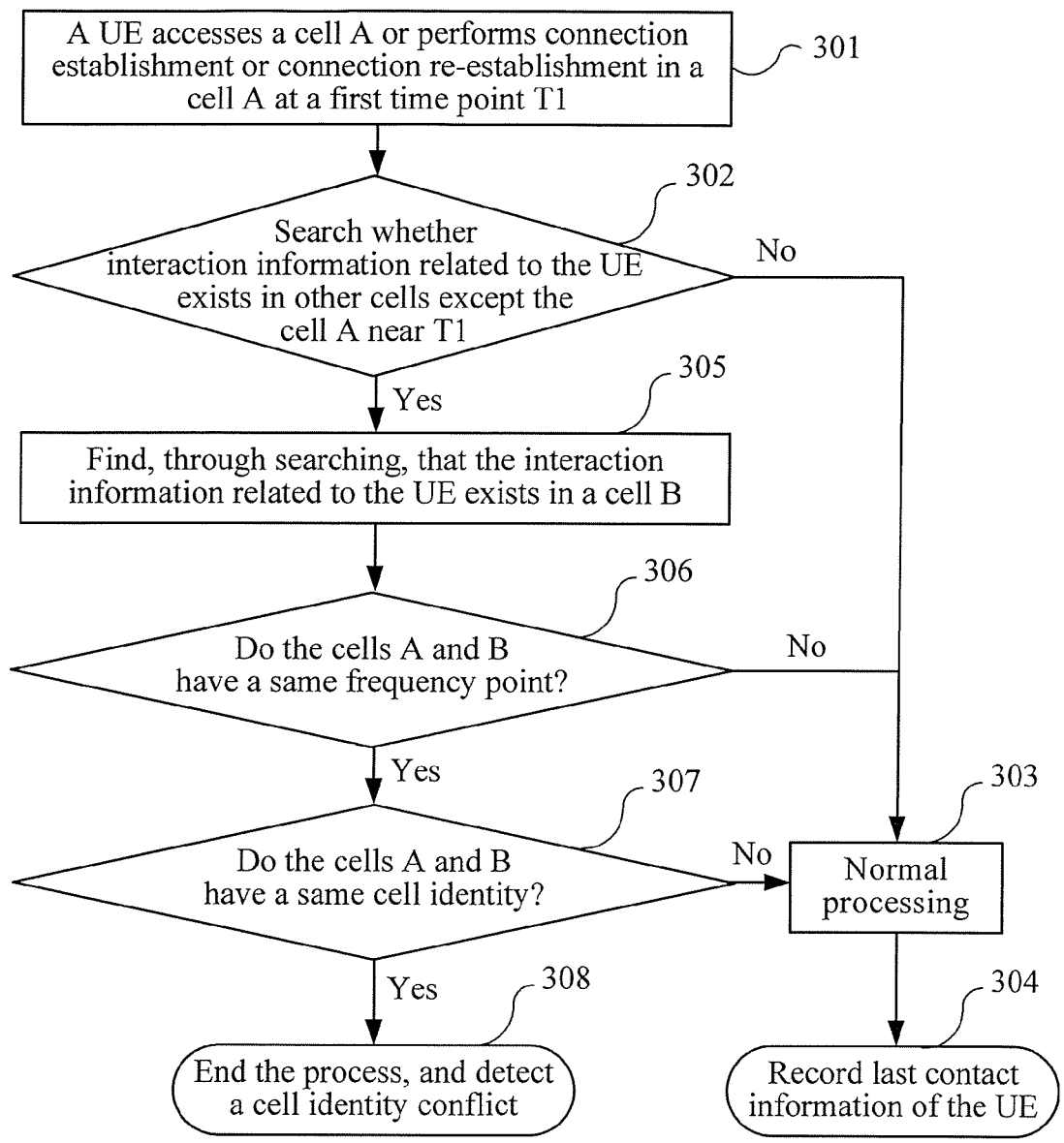
FIG. 3 is a schematic flowchart of a process of detecting a cell identity conflict according to another embodiment of the present invention.

The following describes the embodiment of the present invention in further details with reference to specific examples. FIG. 3 is a schematic flowchart of a process of detecting a cell identity conflict according to another embodiment of the present invention. For ease of description, in the embodiment in FIG. 3, it is assumed that a first cell is the cell A shown in FIG. 1 and a second cell is the cell B shown in FIG. 1, which is, however, not limited by the embodiment of the present invention.

301: A certain UE attempts to access a first cell A or performs connection establishment or connection re-establishment in a first cell A at a first time point T1. For example, a network-side device of the first cell A receives, at T1, relevant signaling of an access attempt from the UE, for example, an RRC (Radio Resource Control, radio resource control) CONNECT REQ (RRC connection request) message in a UMTS. Alternatively, a network-side device of the first cell A receives, at T1, relevant signaling of an attempt to restore an original signaling connection from the UE, for example, a CELL UPDATE (cell update) message in a UMTS or an RRC RE-ESTABLISHMENT REQ (RRC re-establishment request) message in LTE. Optionally, a UE identity or a signaling connection identity corresponding to the relevant signaling of the re-access or the attempt to restore the original signaling connection may be set to "RETRY-OR-RECON-UE-ID". The UE identity may include, but is not limited to, a TMSI (Temporary Mobile Subscriber Identity, temporary mobile subscriber identity), an IMSI (International Mobile Subscriber Identity, international mobile subscriber identity), and an IMEI (International Mobile Equipment Identity, international mobile equipment identity); and the signaling connection identity may include, but is not limited to, an RNTI (Radio Network Temporary Identifier, radio network temporary identifier) and a link identity.

302: Search whether interaction information related to the UE whose identity is "RETRY-OR-RECON-UE-ID" exists in other cells except the first cell A near T1. The interaction information is used to record last contact information between the UE and the other cells.

Optionally, as an embodiment, the last contact information includes last signaling or data interacted between the UE and the other cells and a second time point T2 corresponding to the last signaling or data (for example, a time point when the network-side device receives the last signaling or data). In this case, if it is satisfied that $T1-\Delta T1 \leq T2 \leq T1+\Delta T2$, it may be determined that a cell corresponding to the interaction information is the second cell, where $\Delta T1$ and $\Delta T2$ are predetermined thresholds. Here, "≤" indicates that a time point to the left of this symbol is not later than a time point to the right of this symbol. $\Delta T1$ and $\Delta T2$ may be equal or not equal. One or more factors may be considered in setting of $\Delta T1$ and $\Delta T2$, which is not limited by the embodiment of the present invention. For example, clock deviation between two network-side devices may be considered for $\Delta T1$ and $\Delta T2$; in addition, other factors may be further considered for $\Delta T1$ or $\Delta T2$, for example, a maximum duration needed by the user equipment to move between two cells.

Optionally, the last signaling or data herein may include at least one of the following: last uplink signaling or uplink data, last data whose uplink SINR (Signal to Interference plus Noise Ratio, signal to interference plus noise ratio) or RSRP (Reference Signal Receiving Power, reference signal receiving power) exceeds a threshold, and last HARQ (Hybrid Automatic Repeat Request, hybrid automatic repeat request) feedback information. The last uplink data may be last uplink data whose CRC (Cyclic Redundancy Check, cyclic redundancy check) is correct or incorrect, which is not limited by the embodiment of the present invention. In addition, the last signaling may be valid signaling, and may also be invalid signaling, which is not limited by the embodiment of the present invention.

Optionally, as another embodiment, the last contact information recorded in the interaction information may include a third time point T3 when an RRC connection between the UE and the other cells is released. In this case, if it is satisfied that $T3-\Delta T3 \leq T1 \leq T3+\Delta T4$, it may be determined that a cell corresponding to the interaction information is the second cell, where $\Delta T3$ and $\Delta T4$ are predetermined thresholds. $\Delta T3$ and $\Delta T4$ may be equal or not equal. One or more factors may be considered in setting of $\Delta T3$ and $\Delta T4$, which is not limited by the embodiment of the present invention. For example, clock deviation between two network-side devices may be considered for $\Delta T3$ and $\Delta T4$; in addition, other factors may be further considered for $\Delta T3$ or $\Delta T4$, for example, a maximum duration needed by the user equipment to move between two cells, and a delay of user release in specific implementation on a network side.

The foregoing embodiments of T2 and T3 may be used at the same time or alternatively. Optionally, the last contact information recorded in the interaction information may further include a UE identity (an equipment identity or a user identity) or a signaling connection identity, for example, a TMSI, an IMSI, an IMEI, an RNTI, or a link identity, which is compared with the "RETRY-OR-RECON-UE-ID" set in step 301. Alternatively, the last contact information may further include an identity of the RRC connection between the UE and the other cells. An example of the identity of the RRC connection includes, but is not limited to, a C-RNTI (Cell RNTI, cell RNTI) or an S1-AP ID (S1 Application Protocol Identifier, S1 application protocol identifier) in the LTE, and a U-RNTI (Universal RNTI, universal RNTI) or an IU-AP ID (IU Application Protocol Identifier, IU application protocol identifier) in the WCDMA; the embodiment of the present invention does not limit a specific form of the identity of the RRC connection.

303: Determine that a cell identity conflict does not occur and perform processing according to a normal process, if the interaction information meeting a condition is not detected in step 302, for example, the interaction information of the UE exists in the other cells but a corresponding time point of the interaction information is not near T1, or interaction information of other user equipments exists in the other cells but identities of these user equipments are not "RETRY-OR-RECON-UE-ID". In this case, the UE may implement initial access, or a process of connection establishment or connection re-establishment of the UE is caused by a reason other than the cell identity conflict.

304: Record the last contact information between the UE and the cell A as the interaction information related to the UE in the cell A. The interaction information may record identification information of the cell A, which includes, but is not limited to, an ECGI (Evolved-Universal Terrestrial Radio Access Network Cell Global Identifier, evolved-universal terrestrial radio access network cell global identifier), for other cells to use to determine that the interaction information belongs to the cell A when detection of a cell identity conflict is triggered, and information such as a frequency point and a cell identity is obtained through the ECGI during subsequent detection of the cell identity conflict.

305: If the interaction information meeting the condition is found through searching in step 302, assume that the cell corresponding to the interaction information found through searching is the second cell B. For example, the cell B may be determined through the ECGI of the cell B recorded in the interaction information, so as to obtain information such as a frequency point and a cell identity of the cell B.

306: First determine whether the cells A and B have a same frequency point. A frequency point of a cell is generally a central frequency configuration of the cell, which is not limited by the embodiment of the present invention. If the cells A and B have different frequency points, it may be a normal network planning scenario, because a configuration of a same identity is allowed for inter-frequency cells. In this case, go to steps 303 and 304, and perform the processing according to the normal process. Step 306 is an optional step.

307: Determine whether the cells A and B have a same cell identity (for example, a BSIC, PSC, or PCI), if it is found in step 306 that the cells A and B have the same frequency point. If the cells A and B have different cell identities, determine that a cell identity conflict does not occur between the cells A and B, go to steps 303 and 304, and perform the processing according to the normal process.

308: Determine that a cell identity conflict is detected, if the cells A and B have the same cell identity. The embodiment of the present invention does not limit a solution for the cell identity conflict.

According to the foregoing method, a cell identity conflict can be detected, without relying on cell information reported by a UE and a neighboring cell list.

Particularly, in the embodiment of the present invention, the cell identity conflict in the foregoing cross-boundary and overlapping coverage scenarios described with reference to FIG. 1 can be detected, while the detection of the cell identity conflict in such scenarios is difficult to be performed in the prior art.

Figure 4:
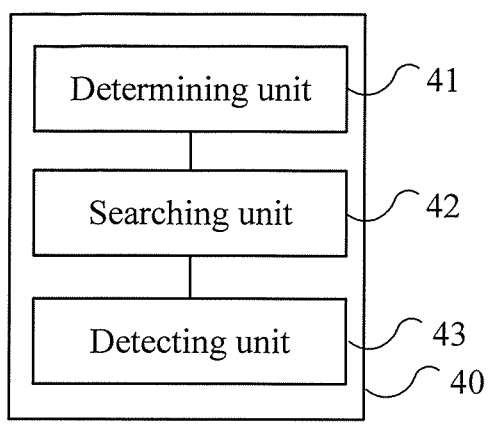
FIG. 4 is a block diagram of an apparatus for detecting a cell identity conflict according to an embodiment of the present invention.

FIG. 4 is a block diagram of an apparatus for detecting a cell identity conflict according to an embodiment of the present invention. A conflict detecting apparatus 40 in FIG. 4 may be implemented by any suitable apparatus; for example, may be implemented by a network element such as a base station, a base station controller, or a network-side server; or may be implemented by a processing apparatus independent of a communications network. As shown in FIG. 4, the conflict detecting apparatus 40 includes a determining unit 41, a searching unit 42, and a detecting unit 43.

The determining unit 41 determines that a user equipment accesses a first cell or performs connection establishment or connection re-establishment in a first cell at a first time point T1. The searching unit 42 searches whether interaction information related to the user equipment exists in other cells except the first cell near the first time point T1 determined by the determining unit 41, where the interaction information is used to record last contact information between the user equipment and the other cells.

The detecting unit 43 performs cell identity conflict detection on the first cell and a second cell when the searching unit 42 finds, through the searching, that the interaction information related to the user equipment exists in the second cell among the other cells near the first time point T1.

In the embodiment of the present invention, whether interaction information exists in other cells near a time point when a user equipment accesses a cell or performs connection establishment or connection re-establishment in a cell is searched, and cell identity conflict detection is performed on the cell and the other cells in which it is found, through searching, that the interaction information exists, without relying on a neighboring cell list and an operation of reporting cell information by the user equipment, thereby improving detection efficiency of a cell identity conflict.

Each component of the conflict detecting apparatus 40 may implement a corresponding step of the method in FIG. 2 and FIG. 3; to prevent repetition, details are not repeatedly described.

Optionally, as an embodiment, the last contact information may include last signaling or data interacted between the user equipment and the other cells and a second time point T2 corresponding to the last signaling or data. In this case, if it is satisfied that $T1-\Delta T1 \leq T2 \leq T1+\Delta T2$, the searching unit 42 may determine that a cell corresponding to the interaction information is the second cell, where $\Delta T1$ and $\Delta T2$ are predetermined thresholds.

Optionally, as another embodiment, the last signaling or data includes at least one of the following: last uplink signaling or uplink data, last data whose uplink SINR or RSRP exceeds a threshold, and last HARQ feedback information.

Optionally, as another embodiment, the last contact information may include a third time point T3 when an RRC connection between the user equipment and the other cells is released. In this case, if it is satisfied that $T3-\Delta T3 \leq T1 \leq T3+\Delta T4$, the searching unit 42 may determine that a cell corresponding to the interaction information is the second cell, where $\Delta T3$ and $\Delta T4$ are predetermined thresholds.

Optionally, as another embodiment, the last contact information may further include an equipment identity or a user identity of the user equipment, or an identity of an RRC connection between the user equipment and the other cells.

Optionally, as another embodiment, the detecting unit 43 may determine whether the first cell and the second cell have a same cell identity when the first cell and the second cell have a same frequency point; and if the first cell and the second cell have the same cell identity, the detecting unit 43 detects that a cell identity conflict occurs between the first cell and the second cell.

Optionally, as another embodiment, if the first cell and the second cell have different frequency points, or if the first cell and the second cell have different cell identities, the detecting unit 43 may further detect that a cell identity conflict does not occur between the first cell and the second cell.

Optionally, as another embodiment, the cell identity may include a BSIC in a GSM, a PSC in a UMTS, or a PCI in an LTE system.

The conflict detecting apparatus 40 can detect a cell identity conflict without relying on cell information reported by a UE and a neighboring cell list. Particularly, the conflict detecting apparatus 40 can detect a cell identity conflict in the foregoing cross-boundary and overlapping coverage scenarios described with reference to FIG. 1, while the detection of the cell identity conflict in such scenarios is difficult to be performed in the prior art.

A person of ordinary skill in the art may be aware that, units and algorithm steps of the examples described in combination with the embodiments disclosed herein can be implemented by electronic hardware, or a combination of computer software and electronic hardware. Whether the functions are performed in a manner of hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely a kind of logical function division, and there may be other division manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be embodied in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for detecting a cell identity conflict, the method comprising:
   determining that a user equipment accesses a first cell or performs connection establishment or connection re-establishment in a first cell at a first time point T1;
   searching whether interaction information related to the user equipment exists in other cells except the first cell near the first time point T1, wherein the interaction information is used to record last contact information between the user equipment and the other cells; and performing cell identity conflict detection on the first cell and a second cell when it is found, through searching, that the interaction information related to the user equipment exists in the second cell among the other cells near the first time point T1, wherein when the last contact information comprises last signaling or data interacted between the user equipment and the other cells and a second time point T2 corresponding to the last signaling or data, searching whether the interaction information related to the user equipment exists in other cells except the first cell near the first time point T1 comprises:

when it is satisfied that $T1-\Delta T1 \leq T2 \leq T1+\Delta T2$, determining that a cell corresponding to the interaction information is the second cell, wherein $\Delta T1$ and $\Delta T2$ are predetermined thresholds; or when the last contact information comprises a third time point T3 when a radio resource control (RRC) connection between the user equipment and the other cells is released, searching whether the interaction information related to the user equipment exists in other cells except the first cell near the first time point T1 comprises:

when it is satisfied that $T3-\Delta T3 \leq T1 \leq T3+\Delta T4$, determining that a cell corresponding to the interaction information is the second cell, wherein $\Delta T3$ and $\Delta T4$ are predetermined thresholds.

2. The method according to claim 1, wherein the last signaling or data comprises at least one of the following: last uplink signaling or uplink data, last data whose uplink signal to interference plus noise ratio (SINR) or reference signal receiving power (RSRP) exceeds a threshold, and last hybrid automatic repeat request (HARQ) feedback information.

3. The method according to claim 1, wherein the last contact information further comprises an equipment identity or a user identity of the user equipment, or an identity of the RRC connection between the user equipment and the other cells.

4. The method according to claim 1, wherein performing cell identity conflict detection on the first cell and a second cell comprises:

determining whether the first cell and the second cell have a same cell identity when the first cell and the second cell have a same frequency point; and when the first cell and the second cell have the same cell identity, detecting that a cell identity conflict occurs between the first cell and the second cell.

5. The method according to claim 4, wherein performing cell identity conflict detection on the first cell and a second cell further comprises:

when the first cell and the second cell have different frequency points, or when the first cell and the second cell have different cell identities, detecting that a cell identity conflict does not occur between the first cell and the second cell.

6. The method according to claim 1, wherein the cell identity comprises a base station identity code (BSIC) in a global system for mobile communications (GSM), a primary scrambling code (PSC) in a universal mobile telecommunications system (UMTS), or a physical cell identity (PCI) in a long term evolution (LTE) system.

7. An apparatus for detecting a cell identity conflict, the apparatus comprising:

a processor; and memory coupled to the processor, the memory comprising instructions that, when executed by the processor, cause the apparatus to:

determine that a user equipment accesses a first cell or performs connection establishment or connection re-establishment in a first cell at a first time point T1;

search whether interaction information related to the user equipment exists in other cells except the first cell near the first time point T1, wherein the interaction information is used to record last contact information between the user equipment and the other cells; and perform cell identity conflict detection on the first cell and a second cell in response to the interaction information related to the user equipment being in the second cell among the other cells near the first time point T1, wherein when the last contact information comprises last signaling or data interacted between the user equipment and the other cells and a second time point T2 corresponding to the last signaling or data, the instructions, when executed by the processor, cause the apparatus to:

when it is satisfied that $T1-\Delta T1 \leq T2 \leq T1+\Delta T2$, determine that a cell corresponding to the interaction information is the second cell, wherein $\Delta T1$ and $\Delta T2$ are predetermined thresholds, or when the last contact information comprises a third time point T3 when a radio resource control (RRC) connection between the user equipment and the other cells is released, the instructions, when executed by the processor, cause the apparatus to:

when it is satisfied that $T3-\Delta T3 \leq T1 \leq T3+\Delta T4$, determine that a cell corresponding to the interaction information is the second cell, wherein $\Delta T3$ and $\Delta T4$ are predetermined thresholds.

8. The apparatus according to claim 7, wherein the last signaling or data comprises at least one of the following: last uplink signaling or uplink data, last data whose uplink signal to interference plus noise ratio (SINR) or reference signal receiving power (RSRP) exceeds a threshold, and last hybrid automatic repeat request (HARQ) feedback information.

9. The apparatus according to claim 7, wherein the last contact information further comprises an equipment identity or a user identity of the user equipment, or an identity of the RRC connection between the user equipment and the other cells.

10. The apparatus according to claim 7, wherein the memory comprises instructions that, when executed by the processor, cause the apparatus to:

determine whether the first cell and the second cell have a same cell identity when the first cell and the second cell have a same frequency point; and when the first cell and the second cell have the same cell identity, detect that a cell identity conflict occurs between the first cell and the second cell.

11. The apparatus according to claim 10, wherein the memory comprises instructions that, when executed by the processor, cause the apparatus to, when the first cell and the second cell have different frequency points, or when the first cell and the second cell have different cell identities, detect that a cell identity conflict does not occur between the first cell and the second cell.

12. The apparatus according to claim 7, wherein the cell identity comprises a base station identity code (BSIC) in a global system for mobile communications (GSM), a primary scrambling code (PSC) in a universal mobile telecommunications system (UMTS), or a physical cell identity (PCI) in a long term evolution (LTE) system.

\* \* \* \* \*